United States Patent
Ronen et al.

(10) Patent No.: US 10,511,615 B2
(45) Date of Patent: Dec. 17, 2019

(54) NON-PROTOCOL SPECIFIC SYSTEM AND METHOD FOR CLASSIFYING SUSPECT IP ADDRESSES AS SOURCES OF NON-TARGETED ATTACKS ON CLOUD BASED MACHINES

(71) Applicant: Microsoft Technology Licensing, LLC, Redmond, WA (US)

(72) Inventors: Royi Ronen, Tel Aviv (IL); Hani Hana Neuvirth, Tel Aviv (IL); Tomer Koren, Tel Aviv (IL); Omer Karin, Jerusalem (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

(21) Appl. No.: 15/587,588

(22) Filed: May 5, 2017

(65) Prior Publication Data
US 2018/0324193 A1 Nov. 8, 2018

(51) Int. Cl.
*H04L 29/06* (2006.01)
*H04L 12/26* (2006.01)
(Continued)

(52) U.S. Cl.
CPC ......... *H04L 63/1416* (2013.01); *G06N 20/00* (2019.01); *H04L 43/04* (2013.01); *H04L 67/10* (2013.01)

(58) Field of Classification Search
CPC . H04L 63/1425; H04L 63/1458; H04L 63/14; H04L 63/1408; H04L 63/1416;
(Continued)

(56) References Cited

U.S. PATENT DOCUMENTS 7,936,682 B2  5/2011  Singh et al.
9,148,434 B2  9/2015  Yu et al.
(Continued)

FOREIGN PATENT DOCUMENTS

WO   2016032491 A1   3/2016
WO   2016138067 A1   9/2016

OTHER PUBLICATIONS

Drasar, et al., "Flow-based Brute-force Attack Detection", In Journal of Advances in IT Early Warning, 2013, pp. 1-13.
(Continued)

*Primary Examiner* — Brian F Shaw
(74) *Attorney, Agent, or Firm* — Workman Nydegger (57) ABSTRACT

A system for detecting a non-targeted attack by a first machine on a second machine is provided. The system includes an application that includes instructions configured to: extract network data corresponding to traffic flow between the first and second machines, where the second machine is implemented in a cloud-based network; identify a first suspect external IP address based on the network data; calculate features for the first suspect external IP address, where the features include exploration type features and exploitation type features; train a classifier based on predetermined examples and the features to generate and update a model; classify the first suspect external IP address based on the model and at least some of the features; and perform a countermeasure if a classification provided from classifying the first suspect external IP address indicates that the first suspect external IP address is associated with a malicious attack on the second machine.

23 Claims, 4 Drawing Sheets

(51) Int. Cl.
*G06N 20/00* (2019.01)
*H04L 29/08* (2006.01)

(58) Field of Classification Search
CPC ............ H04L 63/1475; H04L 63/0272; H04L 63/1441; H04L 41/142; H04L 43/04
USPC ....................................... 726/14, 22, 23, 25
See application file for complete search history.

(56) References Cited

U.S. PATENT DOCUMENTS

| | | |
|---|---|---|
| 2008/0140781 A1* | 6/2008 | Bocharov ............ G06Q 10/107 709/206 |
| 2012/0163196 A1* | 6/2012 | Jansen .............. H04L 29/12933 370/248 |
| 2015/0026809 A1 | 1/2015 | Altman et al. |
| 2015/0052606 A1 | 2/2015 | Romero bueno et al. |
| 2015/0326600 A1 | 11/2015 | Karabatis et al. |
| 2016/0255110 A1 | 9/2016 | Altman et al. |
| 2017/0063893 A1 | 3/2017 | Franc et al. |
| 2017/0359362 A1* | 12/2017 | Kashi ..................... G06N 7/005 |
| 2019/0138938 A1* | 5/2019 | Vasseur ................. H04L 41/145 |

OTHER PUBLICATIONS

Vykopal, Jan, "Flow-based Brute-force Attack Detection in Large and High-speed Networks", In Ph.D. Thesis of Masaryk University, 2013, 107 pages.

Najafabadi, et al., "Machine Learning for Detecting Brute Force Attacks at the Network Level", In Proceedings of the IEEE 14th International Conference on Bioinformatics and Bioengineering, Nov. 10, 2014, pp. 379-385.

Najafabadi, et al., "Detection of SSH Brute Force Attacks Using Aggregated Netflow Data", In Proceedings of the IEEE 14th International Conference on Machine Learning and Applications, Dec. 9, 2015, pp. 283-288.

Sperotto, et al., "Hidden Markov Model modeling of SSH brute-force attacks", In Proceedings of the 20th IFIP/IEEE International Workshop on Distributed Systems: Operations and Management: Intergrated Management of Systems, Services, Processes and People in IT, Oct. 27, 2009, 13 pages.

"International Search Report and Written Opinion Issued in PCT Application No. PCT/US2018/026778", dated Jul. 24, 2018, 10 Pages.

* cited by examiner

NON-PROTOCOL SPECIFIC SYSTEM AND METHOD FOR CLASSIFYING SUSPECT IP ADDRESSES AS SOURCES OF NON-TARGETED ATTACKS ON CLOUD BASED MACHINES

FIELD

The present disclosure relates to security applications, and more particularly to detecting non-targeted attacks on cloud based machines.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud-based networks allow computer processing and storing needs to be moved from on premises networks to hybrid cloud or fully cloud-based networks while satisfying data security access requirements. A cloud-based network may include physical machines (PMs) and virtual machines (VMs). Cloud applications may be implemented via the PMs and/or the VMs. The cloud applications can be accessed from client stations of organizations at remote locations.

SUMMARY

A system for detecting a non-targeted attack by a first machine on a second machine is provided. The second machine is implemented in a server computer of a service provider. The system includes a processor, a memory and an application stored in the memory. The application includes instructions, which are executable by the processor and that are configured to: extract network data corresponding to traffic flow between the first machine and the second machine, where the second machine is implemented in a cloud-based network; identify a first suspect external Internet protocol address based on the network data; and calculate features for the first suspect external Internet protocol address, where the features include exploration type features and exploitation type features. The instructions are further configured to: train a classifier based on predetermined examples and the features to generate and update a model; classify the first suspect external Internet protocol address based on the model and at least some of the features; and perform a countermeasure if a classification provided from classifying the first suspect external Internet protocol address indicates that the first suspect external Internet protocol address is associated with a malicious attack on the second machine.

In other features, a system for detecting an attack by a first machine on a second machine is provided. The second machine is implemented in a server computer of a service provider. The system includes a processor; a memory; and an application stored in the memory and including instructions, which are executable by the processor and that are configured to: extract network data corresponding to traffic flow between the first machine and the second machine, where the second machine is implemented in a cloud-based network; and determine a first suspect external Internet protocol address based on the network data. The instructions are further configured to: calculate features for the first suspect external Internet protocol address, where the features include exploration type features and exploitation type features; classify the first suspect external Internet protocol address based on a model and at least some of the features, where the model is based on predetermined examples, and where each of the predetermined examples has a respective set of features; and perform a countermeasure if classification of the suspect Internet protocol address indicates that the suspect Internet protocol address is associated with a malicious attack on the second machine.

In other features, a non-transitory tangible computer readable medium storing instructions executable by a processor for detecting an attack by a first machine on a second machine. The second machine is implemented in a server computer. The server computer is implemented in a cloud-based network of a service provider. The instructions are for: extracting network data corresponding to traffic flow between the first machine and the second machine, where the second machine is implemented in the cloud-based network; determining a first suspect external Internet protocol address based on the network data; and calculating features for the first suspect external Internet protocol address, where the features include exploration type features and exploitation type features. The instructions are further for: classifying the first suspect external Internet protocol address based on a model and at least some of the features, where the model is based on predetermined examples, and where each of the predetermined examples has a respective set of features; and performing a countermeasure if classification of the suspect Internet protocol address indicates that the suspect Internet protocol address is associated with a malicious attack on the second machine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A security application of a cloud-based network can monitor traffic to and from PMs and VMs of the cloud-based network to detect attacks on, for example, tenants (e.g., customers and/or businesses). This may include monitoring traffic between client computers of organizations and accessed applications implemented by the PMs and VMs. Identifying attacks, such as brute force attacks, on tenants is of high importance for network security. Traditional methods for detecting brute force attacks are tailored for specific protocols, such as a remote desktop protocol (RDP) or a secure shell (SSH) protocol. An attacker may attack systems operating according to the RDP and SSH protocols and other protocols. Designing a specific malicious activity monitoring and blocking system for each of these protocols is not cost effective.

Anomaly detection methods for detecting brute force attacks based on sampled network data using machine learning have been developed. These methods are also RDP specific, are based on supervised learning for a structured query language (SQL) and are port specific. The phrase "port specific" means that the methods are specific to ports operating according to a specific protocol.

The examples set forth herein provide "generic" solutions. The term "generic" as used herein means that the solutions are not protocol specific and/or specific to ports operating according to a particular protocol. The examples include an attack detection system for identifying Internet protocol (IP) addresses of machines external to a cloud-based network and that connect to tenant IP addresses of machines internal to the cloud-based network. IP addresses of machines external to the cloud-based network are referred to herein as "external IP addresses". Similarly, IP addresses of machines internal to the cloud-based network are referred to herein as "internal IP addresses". The external IP addresses connect to the internal IP addresses to perform a malicious activity. As an example, the malicious activity may be associated with a brute force attack. The attack detection system finds external IP addresses that are performing both port scanning (referred to as an "exploration" activity) and repeated interactions (referred to as an "exploitation" activity). Port scanning (or a "scanning attack") includes a device having an external IP address scanning numerous internal IP addresses in an attempt to gain access to one or more devices internal to the cloud-based network. The internal IP addresses may be of different tenants and/or subscriptions. An example of an exploitation activity includes repeated attempts to access and/or repeated access of a same device internal to the cloud-based network.

The attack detection system implements a supervised learning approach, where features are extracted separately for (i) one-time interactions associated with an exploration activity, and (ii) repeated interactions associated with an exploitation activity. The attack detection system successfully identifies brute-force and/or other cyber-attacks (or non-targeted attacks) across different protocols. The attack detection system is not directed to identifying targeted attacks.

A targeted attack (also referred to herein as a "directed targeted attack") refers to an attack that is directed at a particular entity or group of entities, where an entity refers to a PM or a VM. For example, a targeted attacked may be directed at a user device, a group of user devices, a particular tenant (e.g., customer and/or business), VMs and/or PMs of a subscription, VMs and/or PMs executing a particular cloud application, VMs and/or PMs of an industry, VMs and/or PMs in a geographical area (e.g., a city, state or country), etc. A subscription may refer to, for example, rental of one or more resources, a container, a set of machines, a logic subset of machines of a business, and/or a business unit. A business unit includes a set of PMs and/or VMs of a tenant. A cloud service provider provisions resources (such as software applications having corresponding executable code, server computer processing time, and/or storage) via the cloud-based network. Cloud service providers implement infrastructure as a service (IaaS) and platform as a service (PaaS) using VMs or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines.

A targeted attack does not refer to a cyber-attack (or non-targeted attack) performed by an attacking machine that is searching the Internet for any machine for which the attacking machine can obtain access and control. This type of attack typically includes the attacking machine probing the Internet to obtain access and control of any machine. The attacking machine typically has a pattern of attack, uses a same library of passwords, performs attacks at certain times of day, performs attacks in a periodic pattern, etc. In general, non-targeted attacks continuously occur on most if not all machines that can be accessed via the Internet. An attacker performing a targeted attack typically invests a lot of resources to perform the attack. This may include: spending a large amount of time performing the attack; conducting the attack via a large number of machines; transferring a large amount of data and/or signals between one or more attacking machines and the one or more entities being attacked; etc. A targeted attack is more focused than a non-targeted attack and often includes the stealing of data, information, and/or causing harm to the one or more entities being attacked.

The distinction between a targeted attack and a non-targeted attack may not be readily apparent. As an example, if an attacker scans Internet protocol (IP) addresses of VMs belonging to a customer, the attack may be a targeted attack or a non-targeted attack. If the scanning of the VMs is a coincidence, then the attack is a non-targeted attack. If the attacker is periodically or randomly scanning groups of IP addresses and during a certain period of time the attacker scans the IP addresses of the VMs of concern, then the attack is a non-targeted attack. Attackers performing non-targeted attacks usually perform a shallow scan over many victims (i.e. entities being attacked) attempting to affect any machine accessible.

If however the scanning of the VMs is specifically directed at certain VMs and other VMs, such as VMs outside a targeted group, are not attacked, then the attack is a targeted attack. Current port scanning software allows scanning random IP addresses in addition to sequences of IP addresses. Attackers often scan hundreds or even thousands of IP addresses. Thus, the scanning of only a certain set of VMs of concern can be an indicator that a targeted attack has occurred. As another example, if all of the VMs of concern are communicating with a same known malicious IP address belonging to a same customer, then the attack may be a targeted attack. Persistent and/or orchestrated collaboration of malicious activities may be monitored and indicate a targeted attack has occurred. One example reason for a targeted attack is the stealing of credit card information. The targeted attack may be directed to one or more individuals and/or individuals that shop at a certain store. A security breach at a company can cause a large amount of money to be spent curing the breach and negative effects of the breach including repairing a reputation of the company.

By detecting non-targeted attacks, appropriate countermeasures can be performed and/or customers can be alerted of the attacks and can then respond by performing the appropriate actions to block the attacks.

Figure 1:
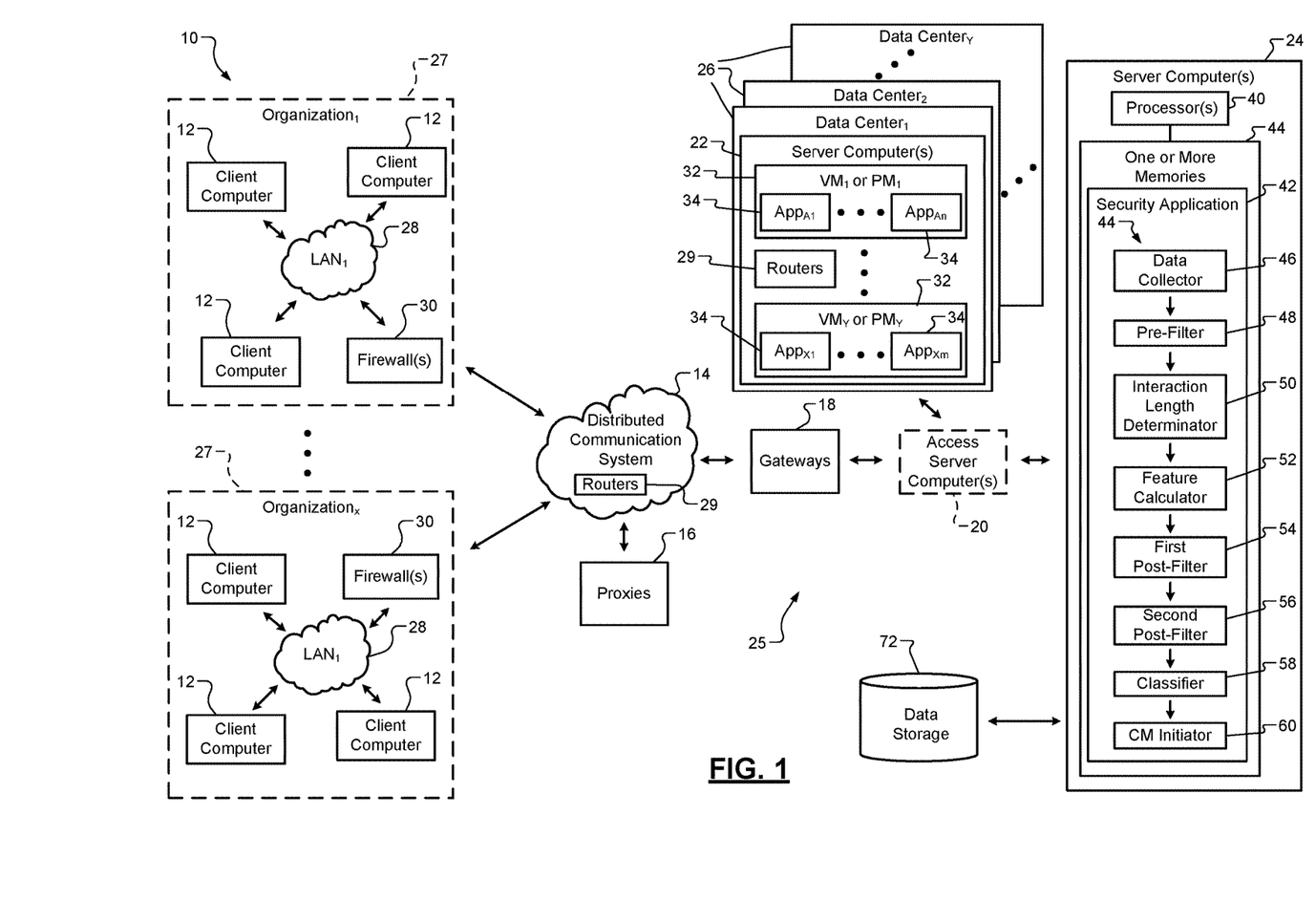
FIG. 1 is a functional block diagram of an example of a security system including a security application in accordance with an embodiment of the present disclosure.
Figure 2:
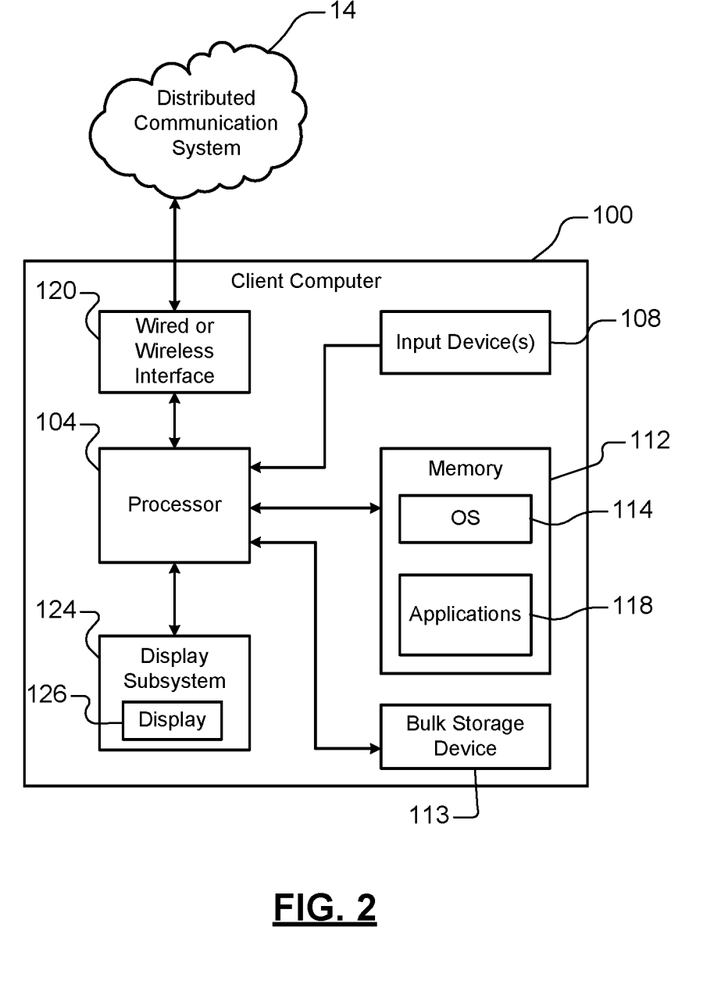
FIG. 2 is a functional block diagram of an example of a client computer in accordance with an embodiment of the present disclosure.

FIG. 1 shows a portion 10 of a security system that includes client computers 12, a distributed communication system 14, proxies 16, gateways 18, one or more access server computers 20, and other server computers 22, 24. In some examples, the gateways 18, one or more access server computers 20, and one or more server computers 22 are implemented in a cloud-based network 25. The server computers 22, 24 may be implemented in data centers; example data centers 26 are shown. Each of the data centers may include data storage and any number of server computers. Example data storage is shown in FIG. 2. The data centers may be located in corresponding geographical regions, where each geographical region refers to: geographical areas of one or more businesses; one or more towns; one or more cities; one or more states; one or more countries; a continent; and/or other geographical area. In some examples, the one or more server computers 24 are implemented in the cloud-based network 25 or in another service provider network. In another example, the access server computers 20 are not included in the security system 10 and the gateways 18 communicate directly with the server computers 22, 24. In the example shown, the client computers are owned by corresponding organizations 27. The organizations 27 may include local area networks (LANs) 28 and firewalls 30. The client computers 12 may access the distributed communication system 14 directly and/or via the LANs 28 and firewalls 30. The distributed communication system 14 may include routers 29. One or more of the organizations 27 may include multiple LANs and corresponding client computers, where each LAN and corresponding client computers are located in a corresponding one of the geographical regions of the data centers 26.

The cloud-based network 25 may be implemented by a cloud service provider and, in an embodiment, includes client virtual machines, network appliances and application server computers. Examples of network appliances include routers (e.g., routers 31), switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers 12 can be implemented in the cloud-based network 25 as VMs and/or PMs 32 or can be located on premises. The network appliances and application server computers may be implemented as one or more VMs of the cloud-based network 25.

The cloud-based network 25 may include one or more of the server computers 22, 24. The cloud-based network 25 further includes resources that may be shared by the client computers 12. The cloud service provider provisions the resources, such as software applications having corresponding executable code, server computer processing time, server computer processor speed, data storage, VMs, PMs, and/or other resources to tenants (e.g., customers and/or businesses) via the cloud-based network 25. The resources may include user management tools, security application resources, or other resources, such as that provided by Microsoft® Azure®, an example of which being HDInsight®. A tenant may have one or more subscriptions. A subscription may refer to, for example, rental of one or more resources, a container, a set of machines, a logic subset of machines of a business, and/or a business unit. A business unit includes a set of PMs and/or VMs of a tenant. Cloud service providers implement infrastructure as a service (IaaS) and platform as a service (PaaS) using VMs or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines. The server computers 22, 24 may include VMs (e.g., $VMs_{1-Y}$ are shown), which may be implemented as PMs (e.g., $PMs_{1-Y}$). The software applications may be implemented on the server computers 22, 24, which may be referred to as physical machines.

The client computers 12 may be privately owned by different individuals and/or entities. In the example shown, the client computers 12 are owned by organizations 27. Each of the client computers 12 may access one or more cloud applications 34 stored in the server computers 22 and/or VMs 32. The organizations 27 may own and/or have paid access to corresponding ones of the VMs 32 and/or cloud applications 34. The client computers 12 may include desk/laptop computers, tablets, mobile phones, wearable devices, access terminals, and/or other network devices for accessing the cloud applications 34. Accessing of the cloud applications 34 may include: communicating with the cloud applications 34; transferring data, packets, information, etc. between the client computers 12 and the server computers 22 in association with the cloud applications 34; modifying and/or updating the cloud applications; and/or uploading and/or downloading the cloud applications 34 and/or files associated with the cloud applications 34.

The distributed communication system 14 may include routers, switches and/or other network devices for directing data and/or packets between (i) the client computers 12 and/or organizations 27 and (ii) the gateways 18. The distributed communication system 14 may include a network, such as a local area network (LAN), a wireless local area network (WLAN), and/or a wide area network (WAN) (e.g., the Internet). The proxies 16 may transfer data, packets, information, etc. between the firewalls 30 and the gateways 18. In an embodiment, the proxies 16 are implemented as part of the distributed communication system 14. The gateways 18 may transfer data, packets, information, etc. between the distributed communication system 14 and the access server computers 20. The access server computers 20 may provide access to direct communication with the server computers 22 and/or 24. In one embodiment, the access server computers 20 are implemented as client access server computers and facilitate providing services, such as services associated with software as a service (SaaS) applications, from the server computers 24 to the client computers 12. The gateways 18, the access server computers 20, the server computers 22 and/or the server computers 24 may be implemented in an internal network of a service provider that provides software applications.

Each of the server computers 24 includes one or more processors 40 that execute software applications, such as a security application 42, which is stored in one or more memories 44. One or more of the VMs 32 and/or other resources to be allocated to customers may be implemented in the server computers 24. The security application 42 includes an attack detection system 42 that includes a data collector 46, a pre-filter 48, an interaction length determinator 50, a feature calculator 52, a first post-filter 54, a second post-filter 56, a classifier 58 and a countermeasure initiator 60. Although the data collector 46, pre-filter 48, interaction length determinator 50, feature calculator 52, first post-filter 54, second post-filter 56, classifier 58 and countermeasure initiator 60 are shown as being part of a single application (the security application 42), the data collector 46, pre-filter 48, interaction length determinator 50, feature calculator 52, first post-filter 54, second post-filter 56, classifier 58 and countermeasure initiator 60 may be implemented as part of two or more applications.

The security application 42 may be provided as a service application by the service provider and used to monitor cloud applications implemented in the cloud-based network 25. The security application 42 monitors behavior of the client computers 12 and/or users of the client computers 12 directed to access of the cloud applications 34 and VMs/PMs 32. The client computers 12 may access the security application 42 via a web browser and corresponding website. The security application 42 collects data, parameters, risk factors, and/or information associated with the behavior and detects anomalies. The security application 42 may monitor, for example, traffic between client computers of organizations and accessed cloud applications, VMs and PMs. The security application 42 monitors information, such as data, logs, parameters, risk factors and/or other information associated with access of the cloud applications, VMs and PMs. The security application 42 detects anomalies based on the information. Based on the information, alerts are generated, which may include the information and/or other information derived therefrom.

The security application 42 may be implemented in the cloud-based network 25 and/or a network of a service provider and is used to monitor activity between (i) client computers and (ii) VMs and/or PMs of the cloud applications. The security application 42 monitors activities of the VM and PMs by monitoring information, such as data, logs, parameters, and risk factors, associated with the packets transmitted to/from the VM and the PMs. Based on the information received, the security application 42 determines whether one or more of the users and/or client computers are attacking one or more of the cloud applications and/or corresponding VMs, PMs, and server computers. The security application 42 may determine whether one or more VMs and/or PMs are attacking other VMs and/or PMs. The security application 42 informs the owners of the VMs and PMs of malicious activity. This allows the owners, the VMs, and/or the PMs to take appropriate actions to prevent further attacks on and/or to block access to the cloud applications. Although the security application 42 is shown as being implemented in the server computer 24, the security application 42 may be implemented in the same server computer as one or more of the VMs.

The security application 42 also performs a non-targeted attack detection method based on data and parameters collected and/or determined to identify non-targeted attacks. The data collector 46, pre-filter 48, interaction length determinator 50, feature calculator 52, first post-filter 54, second post-filter 56, classifier 58 and countermeasure initiator 60 may include execution of one or more methods including use of one or more equations to perform filtering, interaction length determination, feature calculation, and/or classification operations. Operations of the data collector 46, pre-filter 48, interaction length determinator 50, feature calculator 52, first post-filter 54, second post-filter 56, classifier 58 and countermeasure initiator 60 may be iteratively executed for consecutive periods of time.

The data collector 46 is implemented to track the data and parameters. In one embodiment, the data includes Internet protocol flow information export (IPFix) data. The IPFix data may include, for example, source and destination IP addresses, source and destination port identifiers (IDs), synchronization (SYN) transmission control protocol (TCP) flags, etc. The parameters may include first parameters and second parameters. The first parameters may include: IPs of attack entities; user identifiers (IDs) of attacking entities; customer IPs of attacking entities; identifications of attacking tools (e.g., Amap, an attack script, or other attack or scanning based tools) used by attacking entities; a botnet ID; a geographical area of origin of attacker and/or attacking entities; attack pattern information, such as traffic flow rates, number of accesses in a predetermined period of time, timing of accesses, spikes in traffic flow rates, etc.; customer port IDs; and/or other parameters. The second parameters may include: tenant IDs; service subscription IDs; an ID of a domain of operation; an ID of an industry (e.g., health care industry, automotive industry, mobile communication industry, etc.) of the tenant; an ID of a geographical area of the tenant; IDs of geographical areas of origin of users of attacked entities; and/or other IDs for different sets of entities being attacked.

The data collector 46 may collect data from routers 31 and/or other devices and/or machines in the cloud-based network 25 and store the data and/or parameters in a data storage 72. The data collector 46 may communicate with and/or receive data from "agents" implemented in the cloud-based network and monitoring and/or facilitating in data transfer between external IP addresses and internal IP addresses. Agents may refer to devices and/or machines in the cloud-based network and configured to operate as an agent to provide data and/or parameters related to the corresponding data transfer events.

The pre-filter 48 determines external IP addresses of devices that are suspicious of performing a non-targeted attack and thus are referred to as "suspect external IP addresses". The interaction length determinator 50 determines whether interaction events between the suspect external IP addresses and internal IP addresses of devices in the cloud-based network 25 are short interactions or long interactions. In one embodiment, a short interaction is, for example, an interaction for which a number of data flows between a suspect external IP address and one or more internal IP addresses are less than a first predetermined amount. A "data flow" refers to a distinct data transfer event during which data is transferred between the suspect external IP address and the one or more internal IP addresses. Periods between successive data transfer events, such as delay periods and/or periods during which data transfer has stopped, may be indicative of periods between distinct data transfer events. When a first data transfer event has occurred and no further data is scheduled to be transferred, the first data transfer event may be considered to be completed and a successive data transfer is considered to be another distinct data transfer event. A long interaction is, for example, an interaction for which the number of data flows between the suspect external IP address and the one or more internal IP addresses is greater than or equal to a second predetermined amount. The second predetermined amount may be greater than or equal to the first predetermined amount.

In another embodiment, a short interaction is, for example, an interaction for which a duration of data flow between a suspect external IP address and one or more internal IP addresses is less than a first predetermined duration. For this embodiment, a long interaction is, for example, an interaction for which the duration of the data flow between the suspect external IP address and the one or more internal IP addresses is greater than or equal to a second predetermined duration. The second predetermined duration may be greater than or equal to the first predetermined duration.

The features calculator 52 calculates features associated with interactions between suspect external IP addresses and internal IP addresses. Example features are described below. The first post-filter 54 filters out suspect external IP addresses that have less than a predetermined number of short interactions and/or less than a predetermined number of long interactions. The second post-filter 56 filters out suspect external IP addresses for which most or a predetermined percentage of corresponding data flows were not via a single port of a machine associated with the suspect external IP addresses.

The classifier 58 classifies remaining suspect external IP addresses after post-filtering as malicious or not malicious. In one embodiment, the classifier 58 determines a likelihood score of being malicious based on the collected data, determined parameters, and/or the calculated features. In another embodiment, the classifier 58 classifies the remaining suspect external IP addresses based on a predetermined model.

In one embodiment, the classifier 58 is a random forest classifier and updates a model during a training session and classifies sets of information (e.g., collected data, determined parameters and/or calculated features) based on the model. The classifications may indicate whether the sets of information are associated with a malicious attack. The classifications may include respective scores indicating probabilities or likelihood that the sets of information are associated with a malicious attack. The classifier 58 may implement multiple random decision trees to provide a mean prediction. The classifications may be based on importance values of each of the features, where each importance value is a normalized total reduction of the criterion brought by that feature. Each of the importance values may indicate how much the feature is an indicator of whether an external IP address is associated with a malicious attack. The importance values may be referred to as "Gini" importance values. Example importance values are provided below in Table 1.

The countermeasure initiator 60, based on the classifications determined by the classifier 58, performs one or more countermeasures. The countermeasures may include generating alerts to report incidents and sending the alerts to tenant devices, customer devices, service provider devices, and/or other devices such that signals from the malicious IP addresses may be blocked. The countermeasures may include performing tasks to block transmissions from the malicious IP addresses and/or preventing the devices of the malicious IP addresses from accessing devices and/or machines in the cloud-based network 25. Other countermeasures are described below.

Operations of the data collector 46, pre-filter 48, interaction length determinator 50, feature calculator 52, first post-filter 54, second post-filter 56, classifier 58 and countermeasure initiator 60 are further described below with respect to the method of FIG. 4. The data collector 46, pre-filter 48, interaction length determinator 50, feature calculator 52, first post-filter 54, second post-filter 56, classifier 58 and countermeasure initiator 60 may be implemented in separate server computers or in a same server computer. Also, although the data and parameters are described as being stored in the data storage 72, the data and parameters may be stored in memory of a server computer (e.g., the one or more memories 44 of FIG. 1). Operations of the processors 40 and the security application 42, data collector 46, pre-filter 48, interaction length determinator 50, feature calculator 52, first post-filter 54, second post-filter 56, classifier 58 and countermeasure initiator 60 of FIG. 1 are further described below with respect to the non-targeted attack detection method of FIG. 4.

In FIG. 2, a simplified example of a client computer 100 is shown. The client computers 12 of FIG. 1 may be implemented as the client computer 100. The client computer 100 includes a central processing unit (CPU) or processor 104 and an input device 108 such as a keypad, touchpad, mouse, etc. The client computer 100 further includes memory 112 such as volatile or nonvolatile memory, cache or other type of memory. The client computer 100 further includes bulk storage device 113 such as flash memory, a hard disk drive (HDD) or other bulk storage device.

The processor 104 of the client computer 100 executes an operating system 114 and one or more applications 118. For example, the applications 118 may include a browser. The client computer 100 further includes a wired interface (such as an Ethernet interface) and/or wireless interface (such as a Wi-Fi, Bluetooth, near field communication (NFC) or other wireless interface (collectively identified at 120)) that establishes a communication channel over the distributed communication system 14. The client computer 100 further includes a display subsystem 124 including a display 126.

Figure 3:
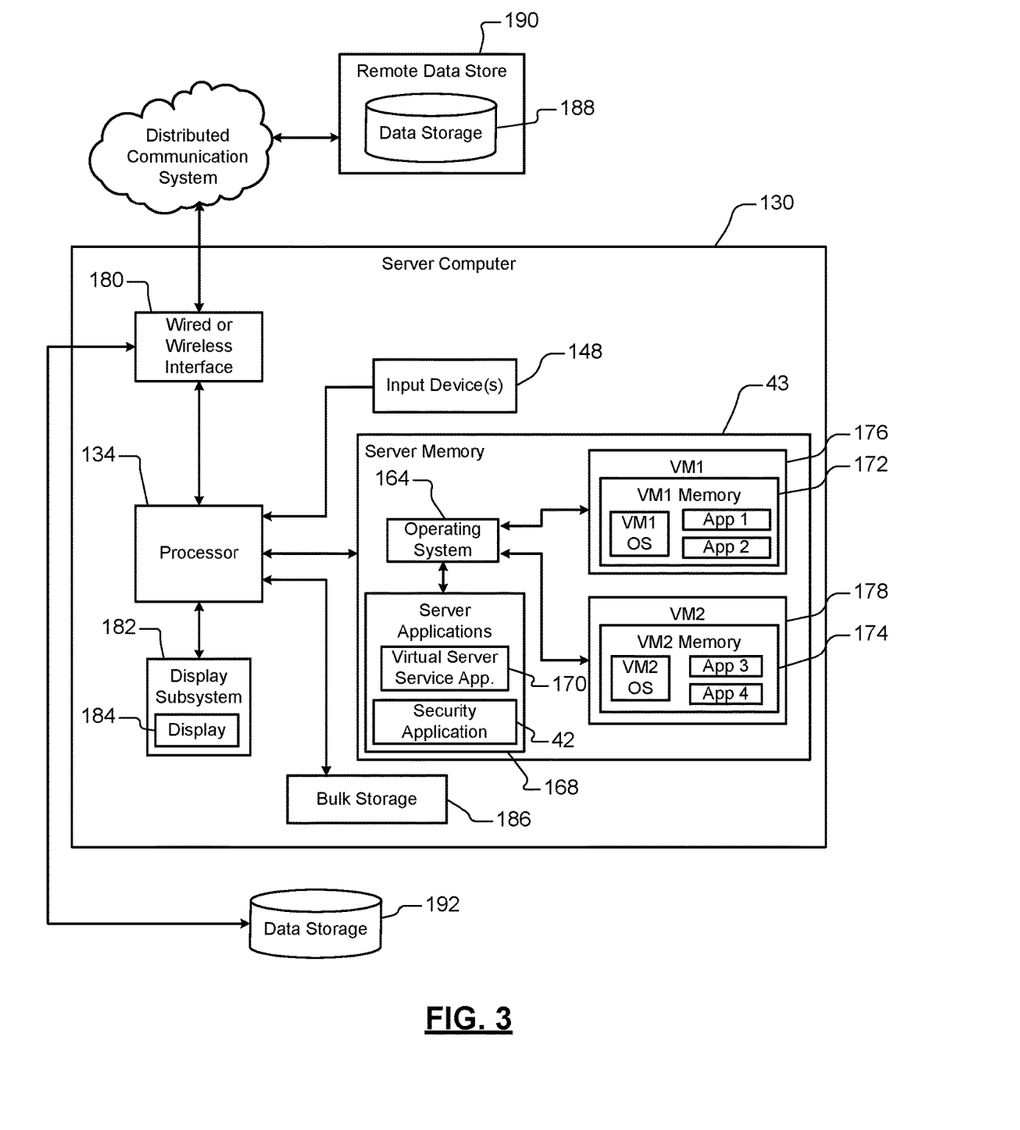
FIG. 3 is a functional block diagram of an example of a server computer incorporating applications in accordance with an embodiment of the present disclosure.

In FIG. 3, an example of a server computer 130 is shown. The server computers 20, 22, 24 of FIG. 1 may be implemented as and/or have similar architecture as the server computer 130. The server computer 130 includes one or more processors and an input device 148 such as a keypad, touchpad, mouse, etc. The server computer 130 further includes a server memory 132, such as volatile or nonvolatile memory, cache or other type of memory, and a processor 134. The processor 134 executes an operating system (OS) 164 and one or more server applications 168 and/or VM applications. Examples of server applications include the security application 42 and a virtual server service application 170, which is implemented in a virtualization layer and is executed along with the OS 164. The virtual server service application 170 creates a virtual environment in which VM (or guest) OSs (e.g., VM1 OS and VM2 OS) run. Example VM applications App 1, App 2, App 3, and App 4 are shown as being implemented in VM memories 172, 174 of VMs 176, 178, respectively. The VM applications may include instances of auto-generated websites, network appliances, storage applications, productivity applications, and/or other VM applications. VM applications App 1-4 are shown as examples. Each of the VM memories may include one or more VM applications.

The server computer 130 further includes a wired or wireless interface 180 that establishes a communication channel over the distributed communication system 14. The server computer 130 further includes a display subsystem 182 that includes a display 184. The server computer 130 may further include a bulk storage device 186 such as flash memory, a hard disk drive (HDD) or other local or remote storage device. The processor 134 may also access a data storage 188 of a remote data store 190 via the interface 180 and the distributed communication system 14, or a data storage 192, such as a database, via the interface 180.

Operations of the client computers 12, server computers 20, 22, 24, and processors 40 of FIG. 1 are further described below with respect to the target detection method of FIG. 4. Although the following operations are primarily described with respect to the implementations of FIG. 1, the operations may be modified to apply to other implementations of the present disclosure. The operations may be iteratively performed. The operations may be referred to as being external IP address specific and are not internal IP address specific. This is because the data, parameters, features and classifications referred to in the following operations are collected, grouped, calculated and/or determined for external IP addresses.

The method begins at 200 and includes execution of the security application 42 by the processors 40. At 202, the data collector 46 collects data (e.g., IPFix data), logs, packets, risk factors, the first parameters, the second parameters, and/or other related information associated with access of the cloud applications 34 and the VMs and/or PMs 32 of the cloud-based network 25. In one embodiment, IPFix data is collected for interactions between external IP addresses and cloud-based internal IP addresses. IPFix data may be included in headers of packets transferred between the external IP addresses and the internal IP addresses.

The related information is tracked over time and may be stored in the memories of the server computers 20, 22, 24 and/or data storage (e.g., the data storage 72, 188, 192). As an example, a log of access information may include an access start time, an access end time, a duration of access, an IP address of a sending entity, an IP address of a receiving entity, a username, a cloud application name, an upload volume of data, a download volume of data, a number of transactions, a number of accesses, a number of packets transferred, a number of requests per second, packet sizes, a number of accesses in a predetermined period, a geographical location where the access occurred, etc.

The security application 42 may request, receive, access, and/or track network activity, parameters and other related information from various sources. As a first example, the security application 42 collects network activity, parameters and other related information from the routers 31, the server computers 20, 22, 24, the VMs and/or PMs 32, and/or other devices and entities within the cloud-based network 25. As another example, one or more of the VMs and PMs 32 include an application (e.g., one or more of the applications 34) configured to operate as an agent, which reports network activity, parameters and other related information tracked to the security application 42. Some examples of parameters are: a user identifier; a client computer identifier; an address of the client computer; a cloud application identifier; a number of transactions between a user/client computer and one or more cloud applications; an amount of traffic between a user/client computer and one or more cloud applications; a number of transactions between a user/client computer and one or more cloud applications with a predetermined period of time; an amount of traffic between a user/client computer and one or more cloud applications within a predetermined period of time; periods of use of one or more cloud applications by a user/client computer; a total number of cloud applications accessed by a user/client computer; and a total number of cloud applications accessed by a user/client computer within a predetermined period of time.

Some of the parameters are risk factors, such as the: number of transactions between a user/client computer and one or more cloud applications; amount of traffic between a user/client computer and one or more cloud applications; number of transactions between a user/client computer and one or more cloud applications with a predetermined period of time; amount of traffic between a user/client computer and one or more cloud applications within a predetermined period of time; periods of use of one or more cloud applications by a user/client computer; total number of cloud applications accessed by a user/client computer; and total number of cloud applications accessed by a user/client computer within a predetermined period of time. Other parameters and risk factors include: geographical area of origin of a user and/or client computer; compliance of activity performed by a user and/or client computer; and a reputation of a user and/or client computer.

The one or more parameters and/or risk factors may be for one or more users/client computers, users/client computers of an organization, VMs and/or PMs of an organization, a predetermined group of users/client computers, and/or one or more cloud applications. The monitored parameters may be monitored per external IP machine, external IP device, and/or one or more external IP ports. The external IP machine may refer to a physical machine or a virtual machine. The data and/or parameters may be stored in tables in the one or more memories 44 and/or in the data storage 72 and accessed during the following operations.

At 203, the data collector 46 may group the data and/or parameters for each of the external IP addresses. The groups of data and/or parameters may be stored, for example, in the data storage 72 and may be accessible to any of the processors 40 and/or the data collector 46, pre-filter 48, interaction length determinator 50, feature calculator 52, first post-filter 54, second post-filter 56, classifier 58 and countermeasure initiator 60.

At 204, the pre-filter 48 pre-filters the external IP addresses to determine suspect external IP addresses having interaction events with cloud-based internal IP addresses. In one embodiment, the external IP addresses having greater than or equal to a predetermined number of data flow and/or interactions with one or more internal IP addresses are considered suspect external IP addresses. In another embodiment, external IP addresses having: greater than or equal to a predetermined number of requests per second; a minimum amount of traffic; and/or greater than or equal to a predetermined amount of data flow in a predetermined period of time, are considered suspect external IP addresses. As another example, if the external IP addresses have more than a predetermined number of connections (e.g., TCP connections) with internal IP addresses, then the external IP addresses are considered suspect external IP addresses. This pre-filtering operation reduces the number of external IP addresses for which features are to be calculated at 208.

In one embodiment, operation 206 is performed prior to operation 204. In this embodiment, the external IP addresses that have more than a predetermined number of short interactions and/or more than a predetermined number of long interactions are considered suspect external IP addresses. As yet another example, if an external IP address has more than a predetermined number (e.g., 4) of TCP data flows or interactions, more than a predetermined number (e.g., 5) short (or low-frequency) interactions, and more than a predetermined number (e.g., 1) long (high-frequency) interactions, then the external IP address is considered to be a suspect external IP address.

At 206, the interaction length determinator 50 identifies short interactions and long interactions between the suspect external IP addresses and internal IP addresses. In one embodiment, the short interactions and long interactions are identified as described above.

In another embodiment, if the number of data flows and/or interactions between a suspect external IP address and one or more internal IP addresses is less than a first predetermined threshold, then all of the data flows and/or interactions between the suspect external IP address and the one or more internal IP addresses are identified as short interactions. In the same embodiment, if the number of data flows and/or interactions between a suspect external IP address and one or more internal IP addresses is greater than or equal to a second predetermined threshold, then all of the data flows and/or interactions between the suspect external IP address and the one or more internal IP addresses are identified as long interactions. The second predetermined threshold may be greater than or equal to the first predetermined threshold.

At 208, the features calculator 52 calculates features for the suspect external IP addresses including features for the short interactions (or exploration interactions) and features for the long interactions (or exploitation interactions). The features summarize different network aspects of the suspect external IP addresses. A first example feature is a percentage of SYN messages corresponding to short interactions.

The port frequency features PortFreq1, PortFreq2, PortFreq3 indicate frequencies of ports in the cloud-based network for which the suspect external IP address is interacting with. The port frequency feature numDistinctRarePorts indicates the number of ports that the suspect external IP address interacts with other than the 10 ports that the suspect external IP address most frequently interacts with. The port frequency features allow the classifier 58 to determine whether the activity of the suspect external IP address is associated with ports of a same type of protocol or with ports of different types of protocols. For example, if the activity is with ports operating according to a same type of protocol (e.g., RDP, SSH, etc.), then the activity is likely malicious. If the activity is associated with ports operating according to different protocols, then the activity is likely not malicious. In Table 1, the feature fracSrcSyn indicates a number of SYN messages of a suspect external IP address divided by a total number of messages of the suspect external IP address.

TABLE 1

Example Features

| Feature Name | Importance Value | Feature Description |
| --- | --- | --- |
| lowFreqSrcSyn | 0.164 | Number of SYN messages of short interactions |
| fracSrcSyn | 0.158 | Total percentage of SYN messages |
| log_lowFreqSrcSyn | 0.130 | Log 10 number of SYN messages of short interactions |
| fracLowFreqSrcSyn | 0.129 | Percentage of SYN messages of short interactions |
| srcDstRatio | 0.049 | Ratio of messages outgoing from external IP address to messages incoming from internal IP addresses |
| fracHighFreqSrcSyn | 0.046 | Percentage of SYN messages of long interactions |
| PortFreq2 | 0.045 | Frequency of the second most frequent port |
| PortFreq1 | 0.041 | Frequency of the most frequent port |
| numDistinctRarePorts | 0.034 | Number of ports used beyond the 10 most frequent ports |
| fracDestReset | 0.030 | Percentage of incoming RST messages |
| numSrcSyn | 0.027 | Total number of SYN messages |
| log_numSrcSyn | 0.025 | Log 10 Total number of SYN messages |
| srcdstTCPRatio | 0.023 | Ratio of outgoing to incoming TCP messages |
| PortFreq3 | 0.020 | Frequency of the third most frequent port |
| fracSrcReset | 0.020 | Percentage of outgoing RST messages |
| fracDestFin | 0.017 | Frequency of incoming finish (FIN) messages |

Another example feature is a percentage of SYN messages corresponding to long interactions. Another example feature is a number of distinct IP addresses that had a short interaction with a suspect external IP address. Another example feature is a number of distinct IP addresses that had a long interaction with a suspect external IP address.

Additional example features are provided in below Table 1. Each of the features in Table 1 is for a single suspect external IP address and any number of internal IP addresses for which the suspect external IP address has interacted with except the features PortFreq1, PortFreq2, PortFreq3 and numDistinctRarePorts (referred to as the port frequency features). Each of the features may also be for data flows associated with exploration interactions and exploitation interactions. An example of a feature associated with an exploration interaction is fracLowFreqSrcSyn. An example of a feature associated with an exploitation interaction is fracHighFreqSrcSyn.

At 210, the first post-filter 54 filters out suspect external IP addresses with less than a first predetermined number of short interactions or less than a second predetermined number of long interactions to provide a first subset of suspect external IP addresses.

At 212, the second post-filter 56 filters out each suspect external IP address of the first subset for which a predetermined number or a predetermined percentage of data flows (or interactions) associated with the suspect external IP address were not on a single port. The single port may refer to a port of a device or machine of an attacker, which is external to the cloud-based network 25. In one embodiment, the second post-filter 56 filters out each external suspect IP address having less than a predetermined frequency of interactions with one or more internal IP addresses. This second post-filtering process provides a second subset of suspect external IP addresses. This filtering may be performed based on the data, parameters and/or features.

At 214, the feature calculator 50 groups the features of each of the suspect external IP addresses. Each suspect external IP address in the second subset has a corresponding set of calculated features. The features are thereby grouped by external IP address.

At 216, one or more of the processors 40 detects malicious activity of an attacker and performs an appropriate countermeasure. At 216A, the classifier 58 classifies each of the external IP addresses in the second subset and/or the interactions of the suspect external IP addresses in the second subset. The classifier 58 may include in a third subset each of the suspect external IP addresses and/or interactions deemed malicious, predicted to be malicious, and/or having a corresponding score as determined at 216A to be greater than a predetermined value to provide a third subset.

The classifications are based on the data, parameters, and/or features of each corresponding suspect external IP address. As an example, the feature values are provided to the classifier 58, which then provides classifications based on the feature values. In one embodiment, the classifier 58 classifies each of the suspect external IP addresses in the second subset for which most (or more than a predetermined percentage) of the traffic for the corresponding suspect external IP address occurred on a single source port of an external device and/or machine having the suspect external IP address. The classifications may indicate whether each of the suspect external IP addresses in the second subset are malicious and/or include a score indicating a probability and/or likelihood that the suspect external IP address is malicious. As described above, the classifier 58 may operate as a random forest classifier and execute a random forest algorithm to provide the stated classifications. The classifications may be based on the predicted mean provided by the random decision trees of the model of the classifier 58.

In one embodiment, the internal IP addresses and/or corresponding devices and/or machines associated with the internal IP addresses that had interactions with external IP addresses classified as malicious are labeled as victims of malicious activity. This information may be stored in the memories 44 and/or the data storage 72. It is likely that the malicious activity is associated with long interactions with the victims.

At 216B, the classifier 58 may further filter out of the third subset certain ones of the suspect external IP addresses to provide a fourth subset. This filtering may include filtering out the suspect external IP addresses of devices and/or machines interacting (i) with a low number (i.e. less than a first predetermined number) tenants having a subscription with the service provider for services associated with the security application 42 and/or cloud-based services for the cloud-based network 25, (ii) with a low number (i.e. less than a second predetermined number) addresses of tenants having a subscription with the service provider for services associated with the security application 42 and/or cloud-based services for the cloud-based network 25, and/or (iii) with devices and/or machines associated with a low number (i.e. third predetermined number) of distinct subscriptions with the service provider for services associated with the security application 42 and/or cloud-based services for the cloud-based network 25. The first, second and third predetermined numbers may be the same or different.

At 216C, the countermeasure initiator 60 performs one or more countermeasures based on the classifications determined at 216A and results of the filtering performed at 216B. In one embodiment, if one or more of the suspect external IP addresses and/or corresponding transactions in the third subset are deemed malicious, predicted to be malicious, and/or has a corresponding score as determined at 216A that is greater than a predetermined value, then a countermeasure is performed. In another embodiment, if one or more of the suspect external IP addresses and/or corresponding transactions in the fourth subset are deemed malicious, predicted to be malicious, and/or has a corresponding score as determined at 216A that is greater than a predetermined value, then a countermeasure is performed. In another embodiment, if tenants and/or corresponding machines that have had long interactions with suspect external IP addresses in the third subset or the fourth subset are deemed malicious, predicted to be malicious, and/or has a corresponding score as determined at 216A that is greater than a predetermined value, then a countermeasure is performed. The long interactions may refer to the long interactions determined at 208. The countermeasures may include reporting the corresponding malicious activity incidents and related information to the tenants and/or corresponding machines. These and other alerts that may be generated are described below.

The countermeasure initiator 60 may prioritize importance of the alerts and investigate alerts with a high priority level. The prioritization may be based on severity of the alert. The severity refers to a level of the potentially negative effects associated with the attack. A severity level may indicate whether, for example, personal data has likely been accessed, malicious code has been installed, software and/or data have been compromised, information has been stolen, etc. The alerts having a high severity level may be reported to a customer. The alerts having a low severity level may be ignored and are often not reported to a customer. As disclosed herein and in addition to information reported in high severity alerts, information reported in low severity alerts can also be used as an indicator of an attack.

The countermeasure initiator 60 generates an alert of an attack incident and/or to perform one or more other countermeasures to block further attacks by the one or more attacking entities associated with the attack incident of concern. The security application 42 performs countermeasures (e.g., generates alerts) to prevent malicious activity based on results of the evaluation. The security application 42 displays at client computers one or more windows/pages via the web browser of statistical data associated with the information collected, anomalies detected, models generated, and/or corresponding alerts. If for example, the anomalies are determined to be a high risk and/or associated with malicious activity, then a countermeasure may be performed to prevent further similar malicious activity.

Statistics associated with the anomalies may be reported including reporting the parameters, identified anomalies, user/customer IDs, client computer IDs and/or addresses, cloud application IDs, VM IDs and/or IP addresses, PM IDs and/or IP addresses, an industry ID, an ID of a geographical area of origin of attacking entity, IDs of geographical areas of origin of entities being attacked, types and/or IDs of corresponding cloud applications, an organization ID, and/or other parameters and features disclosed herein and related statistic information. This information may be reported to corresponding users, client computers, owners and/or representatives of an organization, owners of VMs and/or PMs of cloud applications, and/or representatives of a service provider of the security application 42 and/or the cloud applications. Information provided in the reported alerts and/or statistics may be stored in the memories 44 and/or in the data storage 72 and later accessed.

As another countermeasure, the security application 42 may alert a user, prevent the user from accessing one or more cloud applications from any of the client computers 12, and/or limit access of the user to the one or more cloud applications. As another countermeasure, the security application 42 may alert a client computer, prevent the client computer from accessing one or more cloud applications, and/or limit access of the client computer to the one or more cloud applications. As yet another example, the user and/or the client computer may be limited to operating the one or more cloud applications is a safe operating mode with limited functions. As another countermeasure, a VM and/or PM performing an attack may be limited in operations available to be performed and/or access to the VM and/or PM may be limited and/or presented. As another countermeasure, the security application 42 may provide owners of VMs and/or PMs with an alert and the statistic information. As another countermeasure, the security application 42 may provide a representative and/or owner of an organization and/or a service provider with an alert and the statistic information. In one embodiment, security alerts are generated for the riskiest anomaly groups. The above-described operations allow for risky behavior to be identified and reported.

Although shown as being performed after operation 216B, operation 218 may be performed, for example, subsequent to performing operation 214, 216A, 216B and/or 216C. At 218, one of the processors 40 determines whether a training session is being performed. If a training session is being performed, operation 220 is performed; otherwise the method may end at 224. At 220, the classifier 58 is trained based on predetermined examples and the grouped features for each of the suspect external IP addresses in the second subset, the third subset and/or the fourth subset to generate and/or update a model. The predetermined (or labelled) examples may include sets of data, parameters, and/or features and respective indications of whether the sets are associated with a malicious attack or are not associated with a malicious attack. The examples are referred to as labelled examples since each set includes an indicator, for example a value, indicating whether the set is associated with a malicious attack. The sets may be collected and/or determined using the method of FIG. 4 or may be collected from databases, memories, agents, devices and/or machines in the cloud-based network 25. As a result, the model is trained on data from threat intelligence referring to the sources from which predetermined examples are provided without performing the method of FIG. 4.

The decision trees of the model are trained based on random samples of features, such that each decision tree is different. A resulting classification value may be generated by providing data, parameters and/or feature values as inputs to the corresponding decision trees, sampling outputs of the decision trees, and determining a mean of the output values. The classification value is indicative of a classification, such as one of the classifications provided at 216A.

Figure 4:
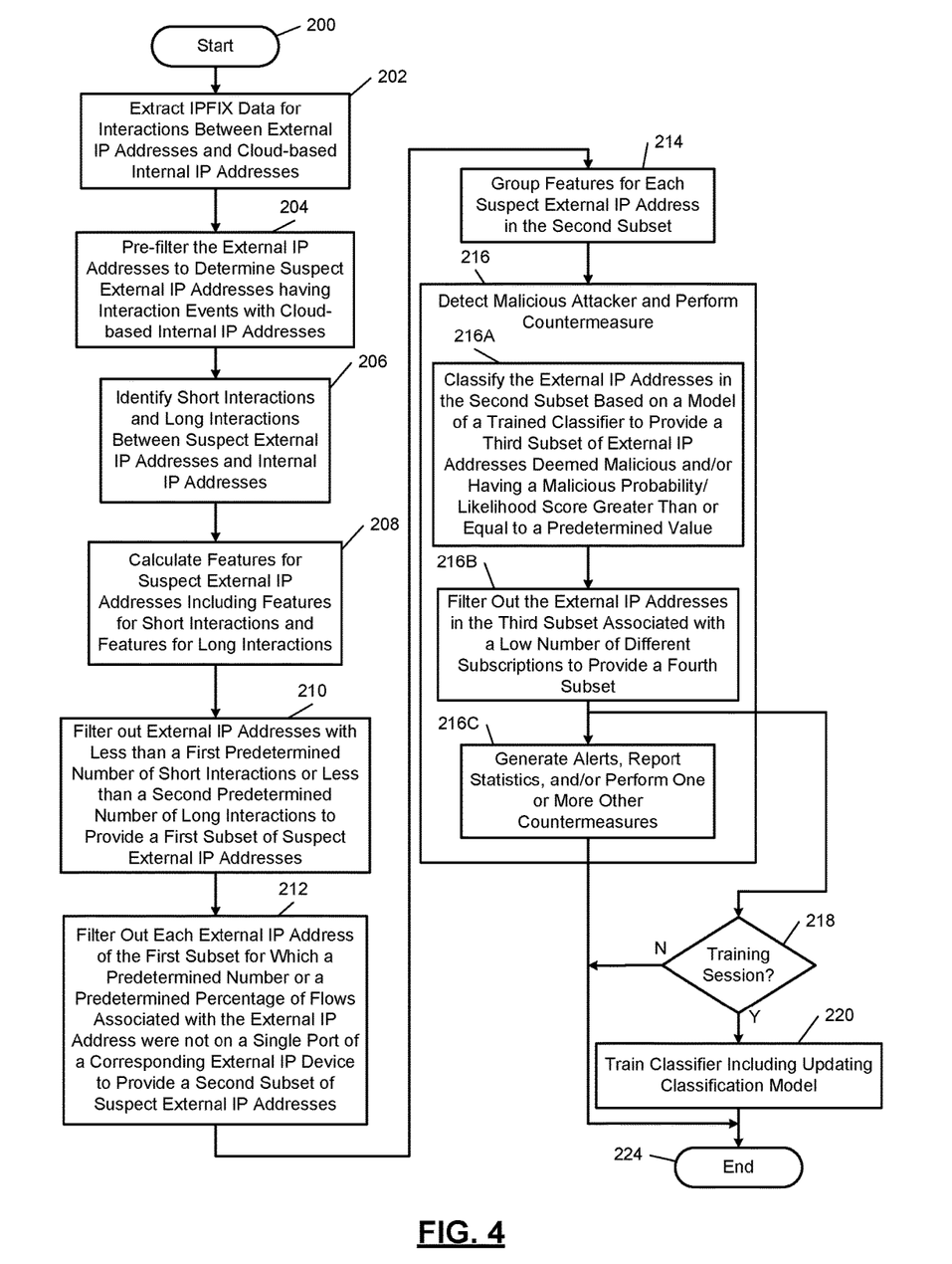
FIG. 4 illustrates a non-targeted attack detection method in accordance with an embodiment of the present disclosure.

In one embodiment, the classifier 58 is periodically trained and thus is not trained during each iteration of the method of FIG. 4. In another embodiment, the classifier 58 is trained during each iteration of the method of FIG. 4. This may occur, for example early on when the model is based on a small number of predetermined examples. The method may end at 224.

The above-described operations of FIG. 4 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

The above-described examples detect non-targeted attacks: across multiple systems, networks, tenants, and subscriptions; across devices and machines of different types; and associated with any number of different types of port protocols. Classifications are provided and based on calculated features for data flows associated with exploration interactions and exploitation interactions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for detecting a non-targeted attack by a first machine on a second machine, wherein the second machine is implemented in a server computer of a service provider, the system comprising:
   a processor;
   a memory; and
   an application stored in the memory and including instructions, which are executable by the processor and that are configured to
      extract network data corresponding to traffic flow between the first machine and the second machine, wherein the second machine is implemented in a cloud-based network,
      identify a first suspect external Internet protocol address based on the network data,
      calculate a plurality of features for the first suspect external Internet protocol address, wherein the plurality of features include exploration type features and exploitation type features,
      train a classifier based on predetermined examples and the plurality of features to generate and update a model,
      classify the first suspect external Internet protocol address based on the model and at least some of the plurality of features, and
      perform a countermeasure if a classification provided from classifying the first suspect external Internet protocol address indicates that the first suspect external Internet protocol address is associated with a malicious attack on the second machine.

2. The system of claim 1, wherein:
   the network data includes Internet protocol flow information export data; and
   the instructions are configured to determine the first suspect external Internet protocol address based on the Internet protocol flow information export data.

3. The system of claim 1, wherein the instructions are further configured to:
   identify a plurality of external Internet protocol addresses based on the network data; and
   pre-filter the plurality of external Internet protocol addresses to provide at least the first suspect external Internet protocol address.

4. The system of claim 1, wherein the instructions are further configured to:
   identify whether a plurality of interactions between the first suspect external Internet protocol address and one or more internal Internet protocol addresses are short interactions or long interactions, wherein the one or more internal Internet protocol addresses are of one or more machines in the cloud-based network, and wherein the one or more machines includes the second machine; and identify the first suspect external Internet protocol address as an address to classify based on the identification of the plurality of interactions as short interactions or long interactions.

5. The system of claim 4, wherein the instructions are further configured to:

identify a plurality of external Internet protocol addresses based on the network data;

pre-filter the plurality of external Internet protocol addresses to provide a plurality of suspect external Internet protocol addresses including the first suspect external Internet protocol address;

filter the plurality of suspect external Internet protocol addresses to provide a subset based on the identifying of the plurality of interactions as short interactions or long interactions; and classify the suspect external Internet protocol addresses in the subset based on the identifying of the plurality of interactions as short interactions or long interactions.

6. The system of claim 1, wherein:

a first portion of the plurality of features are associated with exploration interactions;

a second portion of the plurality of features are associated with exploitation interactions; and the classifying of the first suspect external Internet protocol address is based on the first portion and the second portion.

7. The system of claim 1, wherein the instructions are further configured to:

identify a plurality of suspect external Internet protocol addresses including the first suspect external Internet protocol address;

filter out external Internet protocol addresses with less than a first predetermined number of short interactions or less than a second predetermined number of long interactions to provide a first subset;

filter out each external Internet protocol address of the first subset for which a predetermined number or percentage of interactions between the corresponding external Internet protocol address and one or more internal Internet protocol addresses were not via a single port of the first machine to provide a second subset; and classify the suspect external Internet protocol addresses in the second subset.

8. The system of claim 1, wherein the instructions are further configured to:

determine at least one of a first number of interactions between (i) the first suspect external Internet protocol address and (ii) internal Internet protocol addresses of machines in the cloud-based network associated with subscriptions of a service provider of the cloud-based network, a second number of interactions between (i) the first suspect external Internet protocol address and (ii) machines in the cloud-based network associated with subscriptions of a service provider of the cloud-based network, or a number of different subscriptions associated with internal Internet protocol addresses interacted with by the first suspect external Internet protocol address; and generate the countermeasure if at least one of the first number of interactions, the second number of interactions or the number of subscriptions is less than a predetermined value.

9. The system of claim 1, wherein the instructions are further configured to:

determine whether an interaction between the first suspect external Internet protocol address and an internal Internet protocol addresses is a long interaction, wherein the internal Internet protocol address is an address of the second machine; and perform the countermeasure including alerting the second machine of the malicious attack.

10. A system for detecting an attack by a first machine on a second machine, wherein the second machine is implemented in a server computer of a service provider, the system comprising:

a processor;

a memory; and an application stored in the memory and including instructions, which are executable by the processor and that are configured to extract network data corresponding to traffic flow between the first machine and the second machine, wherein the second machine is implemented in a cloud-based network, determine a first suspect external Internet protocol address based on the network data, calculate a plurality of features for the first suspect external Internet protocol address, wherein the plurality of features include exploration type features and exploitation type features, classify the first suspect external Internet protocol address based on a model and at least some of the plurality of features, wherein the model is based on predetermined examples, and wherein each of the predetermined examples has a respective set of features, and perform a countermeasure if classification of the suspect Internet protocol address indicates that the suspect Internet protocol address is associated with a malicious attack on the second machine.

11. The system of claim 10, wherein:

the network data includes Internet protocol flow information export data; and the instructions are configured to determine the suspect Internet protocol address based on the Internet protocol flow information export data.

12. The system of claim 10, wherein the instructions are further configured to:

identify a plurality of external Internet protocol addresses based on the network data; and pre-filter the plurality of external Internet protocol addresses to provide at least the first suspect external Internet protocol address.

13. The system of claim 10, wherein the instructions are further configured to:

identify whether a plurality of interactions between the first suspect external Internet protocol address and one or more internal Internet protocol addresses are short interactions or long interactions, wherein the one or more internal Internet protocol addresses are of one or more machines in the cloud-based network, and wherein the one or more machines includes the second machine; and identify the first suspect external Internet protocol address as an address to classify based on the identification of the plurality of interactions as short interactions or long interactions.

14. The system of claim 13, wherein the instructions are further configured to:
identify a plurality of external Internet protocol addresses based on the network data;
pre-filter the plurality of external Internet protocol addresses to provide a plurality of suspect external Internet protocol addresses including the first suspect external Internet protocol address;
filter the plurality of suspect external Internet protocol addresses to provide a subset based on the identifying of the plurality of interactions as short interactions or long interactions; and
classify the suspect external Internet protocol addresses in the subset based on the identifying of the plurality of interactions as short interactions or long interactions.

15. The system of claim 10, wherein:
a first portion of the plurality of features are associated with exploration interactions;
a second portion of the plurality of features are associated with exploitation interactions; and
the classifying of the first suspect external Internet protocol address is based on the first portion and the second portion.

16. The system of claim 10, wherein the instructions are further configured to:
identify a plurality of suspect external Internet protocol addresses including the first suspect external Internet protocol address;
filter out external Internet protocol addresses with less than a first predetermined number of short interactions or less than a second predetermined number of long interactions to provide a first subset;
filter out each external Internet protocol address of the first subset for which a predetermined number or percentage of interactions between the corresponding external Internet protocol address and one or more internal Internet protocol addresses were not via a single port of the first machine to provide a second subset; and
classify the suspect external Internet protocol addresses in the second subset.

17. One or more hardware storage devices storing instructions executable by a processor for detecting an attack by a first machine on a second machine, wherein the second machine is implemented in a server computer, and wherein the server computer is implemented in a cloud-based network of a service provider, the instructions are for:
extracting network data corresponding to traffic flow between the first machine and the second machine, wherein the second machine is implemented in the cloud-based network;
determining a first suspect external Internet protocol address based on the network data;
calculating a plurality of features for the first suspect external Internet protocol address, wherein the plurality of features include exploration type features and exploitation type features;
classifying the first suspect external Internet protocol address based on a model and at least some of the plurality of features, wherein the model is based on predetermined examples, and wherein each of the predetermined examples has a respective set of features; and
performing a countermeasure if classification of the suspect Internet protocol address indicates that the suspect Internet protocol address is associated with a malicious attack on the second machine.

18. The one or more hardware storage devices of claim 17, wherein:
the network data includes Internet protocol flow information export data; and
the instructions are configured to determine the suspect Internet protocol address based on the Internet protocol flow information export data.

19. The one or more hardware storage devices of claim 17, wherein the instructions are further for:
identifying a plurality of external Internet protocol addresses based on the network data; and
pre-filtering the plurality of external Internet protocol addresses to provide at least the first suspect external Internet protocol address.

20. The one or more hardware storage devices of claim 19, wherein the instructions are further for:
identifying whether a plurality of interactions between the first suspect external Internet protocol address and one or more internal Internet protocol addresses are short interactions or long interactions, wherein the one or more internal Internet protocol addresses are of one or more machines in the cloud-based network, and wherein the one or more machines includes the second machine; and
identifying the first suspect external Internet protocol address as an address to classify based on the identification of the plurality of interactions as short interactions or long interactions.

21. The one or more hardware storage devices of claim 20, wherein the instructions are further for:
identifying a plurality of external Internet protocol addresses based on the network data;
pre-filter the plurality of external Internet protocol addresses to provide a plurality of suspect external Internet protocol addresses including the first suspect external Internet protocol address;
filtering the plurality of suspect external Internet protocol addresses to provide a subset based on the identifying of the plurality of interactions as short interactions or long interactions; and
classifying the suspect external Internet protocol addresses in the subset based on the identifying of the plurality of interactions as short interactions or long interactions.

22. The one or more hardware storage devices of claim 17, wherein:
a first portion of the plurality of features are associated with exploration interactions;
a second portion of the plurality of features are associated with exploitation interactions; and
the classifying of the first suspect external Internet protocol address is based on the first portion and the second portion.

23. The one or more hardware storage devices of claim 17, wherein the instructions are further for:
identifying a plurality of suspect external Internet protocol addresses including the first suspect external Internet protocol address;
filtering out external Internet protocol addresses with less than a first predetermined number of short interactions or less than a second predetermined number of long interactions to provide a first subset;

filtering out each external Internet protocol address of the first subset for which a predetermined number or percentage of interactions between the corresponding external Internet protocol address and one or more internal Internet protocol addresses were not via a single port of the first machine to provide a second subset; and classifying the suspect external Internet protocol addresses in the second subset.

* * * * *